United States Patent [19]

Buess et al.

[11] 4,048,531

[45] Sept. 13, 1977

[54] VARIABLE RELUCTANCE STEPPER MOTOR

[75] Inventors: Kenneth G. Buess, Union City, N.J.; Murray Hefter, Far Rockaway, N.Y.

[73] Assignee: The Singer Company, Little Falls, N.J.

[21] Appl. No.: 476,547

[22] Filed: June 5, 1974

[51] Int. Cl.² .......................................... H02K 37/00
[52] U.S. Cl. .................................. 310/49 R; 310/80; 310/83; 310/181
[58] Field of Search ............... 310/49, 49 A, 162–164, 310/112, 114, 80, 83, 181, 154

[56] References Cited

U.S. PATENT DOCUMENTS

| | | | |
|---|---|---|---|
| 2,548,731 | 4/1951 | Lehde | 310/49 |
| 3,356,874 | 12/1967 | Chiapparelli et al. | 310/80 X |
| 3,510,699 | 5/1970 | Frederickson | 310/114 X |
| 3,560,774 | 2/1971 | Reeves | 310/49 |
| 3,783,313 | 1/1974 | Mathur | 310/114 X |

*Primary Examiner*—Donovan F. Duggan
*Attorney, Agent, or Firm*—Thomas W. Kennedy

[57] ABSTRACT

A variable reluctance stepper motor includes an energizable first stator cooperative with a first rotor for imparting incremental motion to the rotor and a second stator generating a permanent magnetic field and a second rotor cooperative therewith to restrain the rotor from drift rotation upon deenergization of the first stator. The second stator-second rotor combination defines positions of minimum magnetic reluctance radially angularly coincident with those provided by the first stator-first rotor combination. A lead screw is displaced rectilinearly to provide a linear output according with rotor shaft rotation.

6 Claims, 6 Drawing Figures

VARIABLE RELUCTANCE STEPPER MOTOR

FIELD OF THE INVENTION

This invention relates generally to variable reluctance stepper motors and more particularly to motors of this type providing and maintaining a high accuracy linear output.

BACKGROUND OF THE INVENTION

In variable reluctance (VR) stepper motors, plural stator windings are series connected in separate groups and associated control circuitry successively energizes the winding groups to impart incremental motion to the rotor shaft of the motor. Upon each successive such winding group energization, the rotor rotates until a pole thereof reaches a position of minimum magnetic reluctance relative to a stator pole. The number of such minimum magnetic reluctance positions is related to the numbers of stator and rotor poles and determines the rotor incremental angular rotation occurring on each stator energization. Where VR motors are intended for general usage and particularly at stepping rates inclusive of the resonant stepping rate, damper arrangements are desirably incorporated in the motor to minimize the overshooting of minimum magnetic reluctance positions and thus avoid rotor hunting. Various such damper arrangements are presently known, for example, viscous coupled inertia dampers and electromagnetic dampers exerting continuous drag on the rotor during rotation thereof.

While effective for their intended purpose, such known damper arrangements do not serve to maintain the rotor of a VR motor in fixed position upon motor deenergization. Thus, there is no capability in such known damper arrangements for guarding against rotor drift, i.e., random rotational movements due to environmental disturbances. As respects the viscous type damper, rotor drift can be in the form of rotational movement below the threshold sensitivity level thereof. As for the electromagnetic type dampers, the same are operative only when the stator is energized. Furthermore, known damper arrangements are not rotational position selective in exerting restraining force on VR motor rotors.

The shortcomings of existing VR stepper motors in respect of drift prevention or minimization take on added significance in application thereof to high accuracy linear output control. Thus, in applications within the immediate purview of the present invention, such as those wherein rotor motion is translated by a lead screw into rectilinear displacement of an event-detecting element, rotor drift and hence lead screw movement are matters of critical concern and existing VR motor arrangements are not particularly well suited for use.

SUMMARY OF THE INVENTION

It is an object of the present invention to provide a VR stepper motor incorporating means for minimizing rotor drift upon motor deenergization.

It is a more particular object of the present invention to provide a VR stepper motor providing high accuracy linear output maintainable upon motor deenergization.

A still further object of the invention is to provide a VR stepper motor incorporating rotational position selective means for restraining rotor movement.

In the efficient attainment of the foregoing and other objects, the invention provides a motor including first and second stators separately cooperative with first and second rotors supported on a common rotor shaft, the first stator-rotor pair imparting controllable incremental movement to the rotor shaft upon energization of the first stator to place the rotor shaft in preselected position and the second stator-rotor pair maintaining the rotor shaft in such preselected position upon deenergization of the first stator. For this purpose, the first stator-rotor pair defines a given number of positions of minimum magnetic reluctance between the stator and rotor thereof and the second stator-rotor pair defines the same number of minimum magnetic reluctance positions, or an integral multiple thereof, as between the stator and rotor thereof. To provide linear output, the rotor shaft has a hollow interior including a threaded portion engageable with an exteriorly threaded shaft which is rectilinearly displaced upon rotor shaft rotation.

The foregoing and other objects and features of the invention will be evident from the following detailed description of a preferred embodiment thereof and from the drawings.

DETAILED DESCRIPTION OF THE PREFERRED EMBODIMENT

Figure 1:
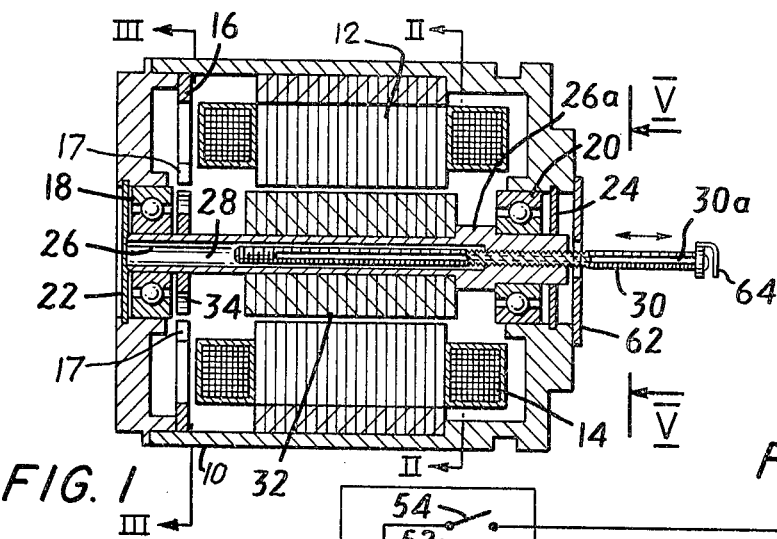
FIG. 1 is a side elevational view in section of a motor constructed in accordance with the invention.
Figure 2:
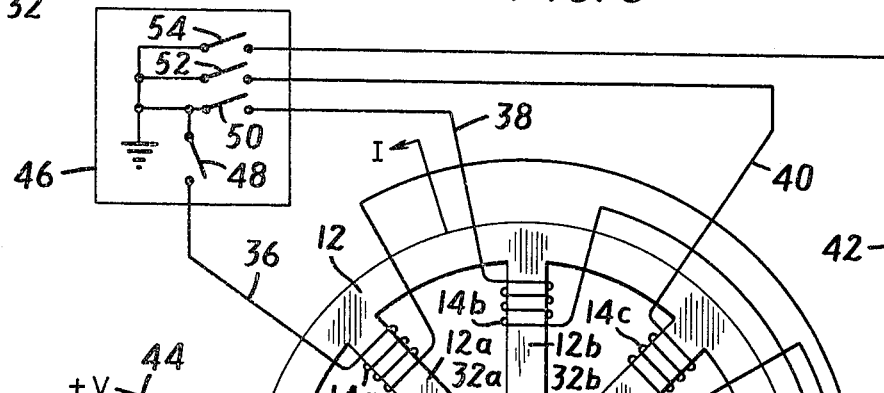
FIG. 2 is a schematic view of one stator-rotor pair of the FIG. 1 motor together with circuitry for selectively energizing the stator windings thereof.
Figure 3:
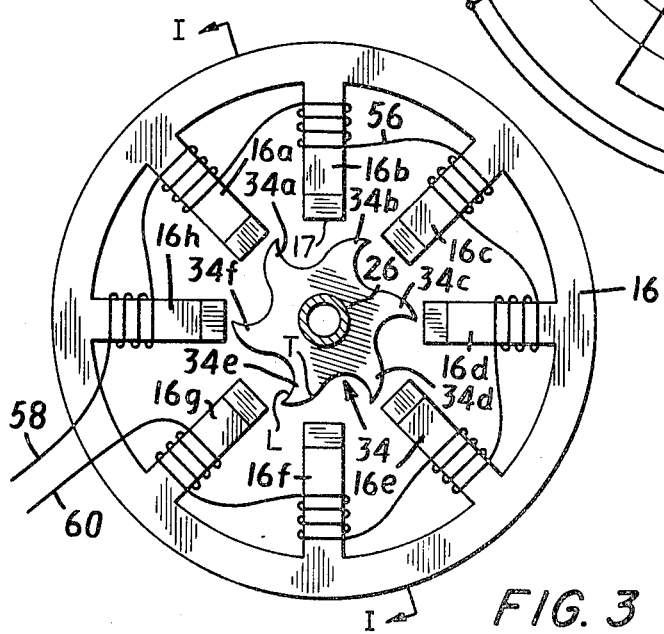
FIG. 3 is a schematic view of the other stator-rotor pair of the FIG. 1 motor and circuitry interconnecting the stator windings thereof.

Referring to FIG. 1, motor housing 10 is of circular cross-section and fixedly supports first stator 12, preferably formed of a stack of laminations each comprised of magnetically permeable material and defining an enlarged central opening. The lamination stack supports stator winding assembly 14. Housing 10 further fixedly supports a second stator 16 comprised of a like stack of laminations defining an enlarged opening coaxial with that of first stator 12 and generating a permanent or fixed magnetic field. As illustrated in FIGS. 2 and 3 which are views of the stators 12 and 16 only as viewed from the planes II—II and III—III, respectively, with the windings shown schematically first stator 12 and second stator 16 include respective pluralities of teeth 12a-12h and 16a-16h, extending radially inward to the central opening thereof and defining poles at the inward ends thereof.

Housing 10 supports end bearings 18 and 20, retained respectively by retainer rings 22 and 24. Bearing 18 supports one end of rotor shaft 26 and bearing 20 supports the other rotor shaft end. Rotor shaft 26 has a hollow interior 28 threaded in part at rotor portion 26a providing for threadable engagement of the rotor shaft with lead screw 30.

Rotor shaft 26 supports a first rotor 32 comprised of stacked laminations of magnetic permeable material radially spaced from and encircled by first stator 12. The rotor shaft further supports a second rotor 34 radially spaced from and encircled by second stator 16. As illustrated respectively in FIGS. 2 and 3, first rotor 32 and second rotor 34 include respective pluralities of teeth, 32a-f and 34a-f, extending radially outward from rotor shaft 26.

Referring to FIG. 2, stator winding assembly 14 comprises individual windings 14a-14h, each encircling one of first stator teeth 12a-12h. Windings 14a-14h are selectively connected in one of four groups, each comprising a separate series circuit. Thus, windings 14a and 14e are in series circuit with line 36, windings 14b and 14f are in series circuit with line 38, windings 14c and 14g are in series circuit with line 40 and windings 14d and 14h are in series circuit with line 42. All such series circuits terminate in line 44. As is customary in energizing VR stepper motors, a stepper controller 46 serves to sequentially energize such series circuits to impart incremental rotation to the rotor of the motor. Such controller 46 may be constructed so as to sequentially close ones of switches 48-54 indicated therein, thus completing circuits to ground from direct current voltage supply +V.

In the arrangement of FIG. 2, eight stator teeth are employed in conjunction with six rotor teeth. The angular displacement between stator teeth being 45° and the angular displacement between adjacent rotor teeth being 60°, incremental rotation of fifteen degrees is imparted to the rotor shaft upon each successive energization of ones of stator windings 14a-h. The stator-rotor pair comprised of first stator 12 and first rotor 32 accordingly defines, in the course of a single revolution of rotor shaft 26, a predetermined number (twenty-four) of rotational positions for first rotor 32 wherein magnetic reluctance exists as between first stator 12 and first rotor 32. Referring to FIG. 3, the same arrangement of eight stator teeth and six rotor teeth defines a like number of rotative positions per shaft revolution for second rotor 34 wherein minimum magnetic reluctance exists as between second stator 16 and second rotor 34. As indicated in FIGS. 2 and 3, each tooth of rotor 34 is in axial alignment with a tooth of rotor 32 and each tooth of stator 12 is in axial alignment with a tooth of stator 16, whereby the minimum magnetic reluctance positions provided by stator 16 and rotor 34 are radially coincident with the minimum magnetic reluctance positions provided by stator 12 and rotor 32. Otherwise stated, the radial angular orientation of each of the first rotor minimum magnetic reluctance rotational positions is identical to the radial angular orientation of one of such rotational positions defined for the second rotor. In the preferred arrangement such rotational positions for the first and second rotors are of the same number. The second rotor positions can also constitute an integral multiple of the first rotor positions with alternate second rotor positions serving to prevent drift, e.g., multiple two.

By way of example of the operation of the motor described to this juncture, if controller 46 is in receipt of control signals e.g., a suitably encoded digital pulse train, calling for a 45° rotation of rotor shaft 26 from its illustrated position, the controller responds by momentarily closing switches 50, 52 and 54 in succession. A magnetic field is accordingly generated by stator 12 and rotated through 45° such that rotor tooth 32a is displaced from initial facing relation with stator tooth 12a into ultimate facing relation with stator tooth 12b. Apart from these initial and final positions of minimum magnetic reluctance, respectively with rotor tooth 32a in facing relation with stator tooth 12a and finally in facing relation with stator tooth 12b, two other such positions of minimum magnetic reluctance are encountered. Thus, the initial fifteen degree rotation of shaft 26 disposes rotor tooth 32c in facing relation to stator tooth 12d and the second fifteen degree rotation places rotor tooth 32b in facing relation with stator tooth 12c.

Figure 4A:
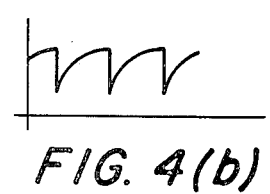
FIGS. 4(a) and 4(b) illustrate signals generated in the FIG. 3 stator windings upon respective clockwise and counterclockwise rotation of the rotor thereof.
Figure 4B:
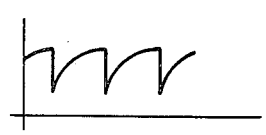

Referring to FIG. 3, a measure of the actual rotation of rotor shaft 26 and the direction of such rotation may be derived from winding 56 of second stator 16. Winding 56 is comprised of individual windings encircling stator teeth 16a-16h and arranged in a common series circuit between lines 58 and 60. The teeth of second rotor 34 define leading and trailing edges having different configuration with resulting generation in winding 56 of signals of respectively different character upon entry of a tooth leading edge (L) into facing relation with the stator tooth (clockwise rotation) and upon the entry of a tooth trailing edge (T) into facing relation with a stator tooth (counter-clockwise rotation). Such opposite polarity signals are shown in FIGS. 4(a) and 4(b).

Figure 5:
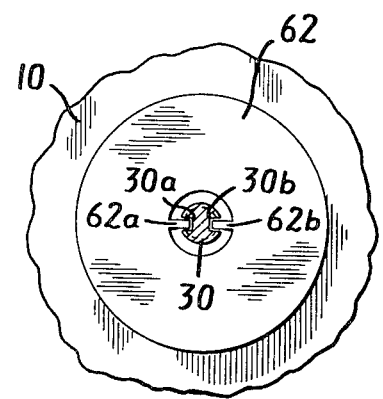
FIG. 5 is a sectional view of the motor of FIG. 1 seen from the plane IV—IV.

Referring to FIGS. 1 and 5, lead screw 30 is externally threaded and includes longitudinal slots 30a and 30b extending axially through such threads. Motor housing 10 fixedly supports a keying disc 62 adjacent retainer ring 24. Keys 62a and 62b of the disc project into slots 30a and 30b and prevent rotation of the lead screw relative to the motor housing and thus constrain the lead screw to bidirectional rectilinear movement, as indicated by the double-headed arrow in FIG. 1, in response to rotation of rotor shaft 26, and prevent corotation of the screw therewith.

A particularly contemplated usage of the motor of the invention, alluded to above, is the positioning of event-detecting switches in integrating accelerometers of the type disclosed in commonly-assigned U.S. Pat. No. 3,771,368, the disclosure of which is incorporated herein by reference. The accelerometers disclosed in such patent employ an event-detecting switch spaced relative to a proof mass and providing indication that a predetermined acceleration has been reached, i.e., that the proof mass has tranversed a preselected distance into engagement with the event-detecting switch. Drive means support the switch and provide for variably positioning the same to provide indication of the attainment of different accelerations.

In the use of the motor of the invention in such applications, lead screw 30 may support an event detecting switch 64 (FIG. 1). As discussed above, the motor first stator windings may be energized to exactingly position the switch whereupon such position is maintained by virtue of the drift-minimizing operation of the second stator and second rotor. The circuit means furnishing direction to stepper controller 46 desirably furnishes a broadened pulse for the last stepping increment to prevent overshoot and stop the rotor shaft at the desired position. Exacting monitoring of rotor shaft movement may be attained by virtue of the aforementioned sensing capabilities of winding 56.

As will now be evident, various changes may be made in the particularly illustrated motor without departing from the invention. Thus, the specific embodiment shown in the drawings and above-discussed is intended in an illustrative and not in a limiting sense. The true spirit and scope of the invention is defined in the following claims.

What is claimed is:

1. A variable reluctance stepper motor comprising:
   a. a first stator having a plurality of poles, with said poles energizable to generate and selectively rotate a magnetic field, including means for energization comprising a first winding encircling each of said poles and first circuit means for providing plural series circuits, each series circuit including therein a distinct group of such first windings, said first stator generating an incrementally rotating magnetic field upon sequential energization of said series circuits;
   b. a rotor shaft;
   c. a first rotor having a second number of poles different from the number of poles in said first stator, said first rotor supported by said shaft in radially spaced relation to said first stator for imparting rotation to said shaft in accordance with rotation of said magnetic field, said first stator and said first rotor together defining a predetermined number of rotational positions for said first rotor where minimum magnetic reluctance exists between said first stator and said first rotor;
   d. a second stator having a third number of poles;
   e. a second rotor supported by said shaft in radially spaced relation to said second stator, said second rotor having a fourth number of poles different from said third number of poles with the poles of said rotor and said stator defining a further number of rotational positions for said second rotor wherein a minimum magnetic reluctance exists between said second stator and said second rotor, said further rotational position number being equal to or an integral multiple of said predetermined rotational position number; and
   f. means associated with said second stator and said second rotor for generating a fixed magnetic field for restraining rotation of said rotor shaft from one of said further predetermined number of rotational positions upon de-energization of said first stator.

2. A variable reluctance stepper motor comprising;
   a. a first stator having a plurality of poles, with said poles energizable to generate and selectively rotate a magnetic field;
   b. a rotor shaft;
   c. a first rotor having a second number of poles different from the number of poles in said first stator, said first rotor supported by said shaft in radially spaced relation to said first stator for imparting rotation to said shaft in accordance with rotation of said magnetic field, said first stator and said first rotor together defining a predetermined number of rotational positions for said first rotor where minimum magnetic reluctance exists between said first stator and said first rotor;
   d. a second stator having a third number of poles;
   e. a second rotor supported by said shaft in radially spaced relation to said second stator, said second rotor having a fourth number of poles different from said third number of poles with the poles of said rotor and said stator defining a further number of rotational positions for said second rotor wherein a minimum magnetic reluctance exists between said second stator and said second rotor, said further rotational position number being equal to or an integral multiple of said predetermined rotational position number, a plurality of windings, each winding encircling one of said second stator poles, said second rotor including a plurality of teeth extending radially relative to said rotor shaft, each of said teeth defining one of said second rotor poles, and inducing signals in said winding of respectively different character upon respective clockwise and counterclockwise rotation of said rotor shaft; and
   f. means associated with said second stator and said second rotor for generating a fixed magnetic field for restraining rotation of said rotor shaft from one of said further predetermined number of rotational positions upon de-energization of said first stator.

3. The motor claimed in claim 2 wherein each of said teeth defines edges successively spaced in the direction of rotation thereof and of respectively different configuration.

4. A variable reluctance stepper motor comprising;
   a. a first stator having a plurality of poles, with said poles energizable to generate and selectively rotate a magnetic field;
   b. a rotor shaft defining a hollow interior in part threaded, said motor further including an exteriorly threaded shaft disposed in said rotor shaft interior in engagement with said threaded part thereof and displaced rectilinearly upon rotation of said rotor shaft;
   c. a first rotor having a second number of poles different from the number of poles in said first stator, said first rotor supported by said shaft in radially spaced relation to said first stator for imparting rotation to said shaft in accordance with rotation of said magnetic field, said first stator and said first rotor together defining a predetermined number of rotational positions for said first rotor where minimum magnetic reluctance exists between said first stator and said first rotor;
   d. a second stator having a third number of poles;
   e. a second rotor supported by said shaft in radially spaced relation to said second stator, said second rotor having a fourth number of poles different from said third number of poles with the poles of said rotor and said stator defining a further number of rotational positions for said second rotor wherein a minimum magnetic reluctance exists between said second stator and said second rotor, said further rotational position number being equal to or an integral multiple of said predetermined rotational position number; and
   f. means associated with said second stator and said second rotor for generating a fixed magnetic field for restraining rotation of said rotor shaft from one of said further predetermined number of rotational positions upon de-energization of said first stator.

5. The motor claimed in claim 4 wherein the surface of said exteriorly threaded shaft defines a slot extending axially relative to said rotor shaft, said motor further including key means engageable with said slot for preventing corotation of said exteriorly threaded shaft with said rotor shaft.

6. A variable reluctance stepper motor comprising;
   a. a first stator having a plurality of poles, with said poles energizable to generate and selectively rotate a magnetic field;
   b. a rotor shaft;
   c. first rotor having a second number of poles different from the number of poles in said first stator, said first rotor supported by said shaft in radially spaced relation to said first stator for imparting rotation to said shaft in accordance with rotation of said magnetic field, said first stator and said first rotor together defining a predetermined number of rotational positions for said first rotor where minimum magnetic reluctance exists between said first stator and said first rotor;
d. a second stator having a third number of poles;
e. a second rotor supported by said shaft in radially spaced relation to said second stator, said second rotor having a fourth number of poles different from said third number of poles with the poles of said rotor and said stator defining a further number of rotational positions for said second rotor wherein a minimum magnetic reluctance exists between said second stator and said second rotor, said further rotational position number being equal to or an integral multiple of said predetermined rotational position number;
f. means associated with said second stator and said second rotor for generating a fixed magnetic field for restraining rotation of said rotor shaft from one of said further predetermined number of rotational positions upon de-energization of said first stator; and
g. a plurality of windings, each winding encircling one of said second stator poles, the windings encircling each of said second stator poles all connected in series with each other.

* * * * *